United States Patent [19]

Kruse

[11] 4,125,573

[45] Nov. 14, 1978

[54] POLYMER POLYBLEND COMPOSITION

[75] Inventor: Robert L. Kruse, Springfield, Mass.

[73] Assignee: Monsanto Company, St. Louis, Mo.

[21] Appl. No.: 670,938

[22] Filed: Mar. 26, 1976

[51] Int. Cl.$^2$ ................................................ C08L 9/06
[52] U.S. Cl. ........................... 260/876 R; 260/880 R; 260/890; 260/892
[58] Field of Search ................. 260/879, 880 R, 876, 260/892, 890

[56] References Cited

U.S. PATENT DOCUMENTS

| | | | |
|---|---|---|---|
| 3,189,592 | 6/1965 | Norwood et al. | 526/65 |
| 3,243,481 | 3/1966 | Ruffing et al. | 260/880 R |
| 3,311,675 | 3/1967 | Doak et al. | 260/880 R |
| 3,488,743 | 1/1970 | Baer et al. | 260/879 |
| 3,868,434 | 2/1975 | Westphal et al. | 260/880 R |
| 3,903,202 | 9/1975 | Carter et al. | 260/880 R |
| 3,928,495 | 12/1975 | Dalton | 260/876 R |
| 3,931,356 | 1/1976 | Dalton | 260/876 R |

OTHER PUBLICATIONS

Billmeyer, Textbook of Poly. Sci., (Interscience, 1962), pp. 6, 7, 13, 352, 386, 388.
Morton, Rubber Tech., 2nd ed. (Van Nostrand, 1973), pp. 189–190.

*Primary Examiner*—Thomas De Benedictis, Sr.
*Attorney, Agent, or Firm*—Joseph S. Nelson; William J. Farrington; James C. Logomasini

[57] ABSTRACT

This invention relates to an improved polymeric polyblend characterized by a blend of (A) a polymer of at least one monoalkenyl aromatic monomer having dispersed therein an amount sufficient to toughen said polyblend of a (B) diene rubber, said rubber being dispersed as crosslinked grafted rubber particles wherein said improvement comprises (C) said diene rubber being a particular polybutadiene rubber having a broad molecular weight range providing the polyblend with greatly improved impact strength.

11 Claims, No Drawings

POLYMER POLYBLEND COMPOSITION

BACKGROUND OF THE INVENTION

High impact polystyrene polyblends (HIPS) comprising polystyrene having a rubber phase dispersed therein, as crosslinked rubber particles, are known. Historically, mechanical blends were prepared by melt blending polystyrene with raw rubber which was incompatible and dispersed as crosslinked rubber particles to reinforce and toughen the polymeric polyblend. More recently, HIPS polyblends have been prepared by mass polymerizing solutions of diene rubber dissolved in styrene monomer in batch reactors wherein the rubber molecules were grafted with styrene monomer forming polystyrene polymer grafts on the rubber along with polystyrene polymer in situ in the monomer. As the polystyrene-monomer phase increases during polymerization the grafted rubber phase inverts readily as rubber particles comprising grafted rubber and occluded polystyrene contained therein with said particles crosslinked to maintain the rubber particles as discrete particles dispersed in the polystyrene which forms a matrix phase of the HIPS polyblend.

U.S. Pat. No. 3,488,743 teaches HIPS polyblends prepared with polybutadiene rubbers having a range of molecular weights and prefers a range of from about 30,000 to 110,000 when polymerized in solution with polymonovinylidene polymers being present during polymerization, providing a balance between impact strength, toughness and gloss. Commercial rubbers are taught to range from about 120,000 to 250,000 with impact strength being maximized at about 150,000 when polymerized in solutions with the monomers alone. U.S. Pat. No. 3,311,675 teaches methods of preparing HIPS polyblends using diene rubbers and indicates that the diene rubbers usually have a molecular weight of 15,000 and higher with no definition of a preferred molecular weight range to maximize toughness.

Engineering uses of HIPS polyblends require improved toughness where load bearing properties are needed in automotive and appliance applications. It has been discovered that polybutadiene rubbers having a higher molecular weight and broader molecular weight distribution than the commercial rubber used by the prior art, provide such rubber reinforced polyblends with greater toughness.

An objective of the present invention is to provide HIPS polyblend compositions with greater toughness.

Another objective is to provide HIPS polyblends toughened with particular polybutadiene rubbers having higher molecular weights and broader molecular weight distributions.

SUMMARY OF THE INVENTION

The present invention relates to:

An improved polymeric polyblend composition characterized by a blend of:

A. a polymer of at least one monoalkenyl aromatic monomer having dispersed therein an amount sufficient to toughen said polymer of B. a diene rubber, said rubber being dispersed as crosslinked rubber particles being grafted with said monomer as polymer and having occluded therein said polymer, said particles having a weight average diameter of from about 0.5 to 10 microns, wherein said improvement comprises:

C. said diene rubber being a polybutadiene rubber having a broad molecular weight distribution characterized by having a dispersion index of at least about 2 and a microstructure having a cis-1,4 isomer content of from about 30 to 85 percent.

DESCRIPTION OF THE PREFERRED EMBODIMENTS

THE POLYMER

The polymer is a polymonoalkenyl aromatic polymer comprised of at least one monoalkenyl aromatic monomer of the formula:

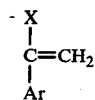

where Ar is selected from the group consisting of phenyl, halophenyl, alkylphenyl and alkylhalophenyl and mixtures thereof and X is selected from the group consisting of hydrogen and an alkyl radical of less than three carbon atoms.

Exemplary of the monomers that can be employed in the polymer are styrene; alpha-alkyl monovinylidene monoaromatic compounds, e.g., alpha-methylstyrene, alpha-ethylstyrene, alphamethylvinyltoluene, etc.; ring-substituted alkyl styrenes, e.g., vinyl toluene, o-ethylstyrene, p-ethylstyrene, 2,4-dimethylstyrene, etc.; ring-substituted halostyrenes, e.g., o-chlorostyrene, p-chlorostyrene, o-bromostyrene, 2,4-dichlorostyrene, etc.; ring-alkyl, ring-halo-substituted styrenes, e.g., 2-chloro-4-methylstyrene, 2,6-dichloro-4-methylstyrene, etc. If so desired, mixtures of such monovinylidene aromatic monomers may be employed.

A preferred group of rubbers are the stereospecific polybutadiene rubbers formed by the polymerization of 1,3-butadiene. The microstructure of these rubbers have a cis 1,4-isomer content of about 30–85 percent and a trans 1,4-isomer content of about 70–15 percent and generally contain at least about 85 percent of polybutadiene formed by 1,4 addition with no more than about 15 percent by 1,2 addition. Mooney viscosities of the rubber (ML-4, 212° F.) can range from about 20 to 120, preferably 30 to 60 with a second order transition temperature of from about $-50°$ to $-105°$ C. as determined by ASTM Test D-746-52T.

The polybutadiene rubbers can be polybutadiene, poly-2-methylbutadiene or poly-2-chlorobutadiene. The molecular weight of the polybutadiene rubber can range from 250,000 to 750,000 as a weight average molecular weight ($M_w$) and from about 125,000 to 200,000 as a number average molecular weight ($M_n$) having a broad molecular weight distribution characterized as a molecular weight dispersion index of from about 2.0 to 6.0, i.e., ($M_w/M_n$ = Dispersion Index).

Since every high polymer actually consists of a mixture of molecular weights, the measurement of molecular weight is really a measurement of an average molecular weight of a given population of molecules. Depending on the method of measurement, different averages are obtained. The two most commonly used are the number average, $M_n$, and the weight average, $M_w$. The former is derived from measurements that actually count the number of molecules, hence, small molecules effect such measurements more strongly while the latter is usually based on light scattering measurements where large molecules contribute more strongly to the observed measurement. For the idealized case where all molecules are of the same size $M_n$ equals $M_w$. However, since this is not true in practice, the ratio of $M_w$ to $M_n$ provides a parameter that shows the breadth of the distribution of the molecular weight species and as $M_w/M_n$ or the dispersion index increases the molecular weight distribution is broader.

The method used to determine the molecular weight of the rubber polymers is based on gel permeation chromatographic analysis well known to those skilled in the art and published in the Journal of Chemical Education, Vol. 43, July 1966 by Jack Cazer as "Gel Permeation Chromatography". The instrument used was Model GPC 200 supplied by Waters Associates of Medford, Mass., using a column of light sections (1) Bio-glas-2500A, (2) GPC-10-2000A, (3) GPC-10-700A, (4) GPC-10-240A, (5) GPC-10-75A, (6) Styragel-3000A, (7) Styragel-1000A and (8) Styragel-250A, Two ml. of a solution with 0.25 gm of rubber/100 ml. of THF is injected into the column with the column operating with THF at 45° C., at a flow rate of 2 ml/min. The column is calibrated with "polystyrene narrow distribution standards". A "Q" factor of 21.4 was used in calculating the $M_w$ and $M_n$ values based on the published article of J. Cazer.

Polybutadiene rubbers prepared commercially with n-butyllithium in n-hexane have a microstructure of about 6-15 percent vinyl-1,2; 52-56 percent trans-1,4 and 33-38 percent cis-1,4 configurations. Such polybutadienes are used commercially in large quantities to toughen polystyrene polyblends but have been found to have a very narrow molecular weight with a dispersion index less than about 1.5 and do not have optimum properties for toughening and reinforcing polystyrene polyblends.

It has been discovered that if the molecular weight distribution is broadened that the rubbers have greater toughening capacity for polyblends. In particular, if the dispersion index is greater than 2 in the range of about 2 to 6 that impact strength of the polyblend is dramatically increased by as much as 100 percent.

Polybutadienes can be prepared with broader molecular weights by the process disclosed in U.S. Pat. No. 3,189,592. Such polybutadienes can be prepared with molecular weight distributions broadened particularly in the high and low molecular weight fractions of the distribution giving a higher dispersion index and greater reinforcing capacity to absorb energy giving higher impact strength to the polyblend.

Process for Preparation of HIPS Polyblends

The polyblends can be prepared by the mass polymerization of the monomers containing the rubber dissolved therein. Alternatively they can be prepared mass-suspension processes wherein the monomer-rubber solution is first polymerized to about 10 to 50 percent conversion and then suspended in water and the polymerization finished in bead form. Thermal or catalytic polymerization can be used.

One such suitable continuous process for preparing the novel polyblends of the present composition is disclosed in U.S. Pat. No. 3,903,202. The most critical requirement is that the prepolymerization of 10 to 50 percent conversion be carried out in a continuous flow through, stirred tank, back mixing, reactor. High grafting free radical catalysts are used in the polymerization to insure a high level of grafting to the diene rubber. Such catalysts are monomer-soluble peroxy types such as tert-butyl perbenzoate, tert-butyl peracetate, dicumyl peroxide, etc., or mixtures thereof. The catalyst is charged with the monomer in amounts of about 0.001 to 3.0 percent by weight based on monomer preferably 0.005 to 1.0 percent depending primarily on the monomer used.

A monomer composition comprising at least one monoalkenyl aromatic monomer having about 2-15 percent by weight of a diene rubber dissolved therein is charged continuously as a monomer-rubber solution to the initial reaction zone. The monomer is polymerized at temperatures of about 110°-145° C., in the first zone converting about 10-50 percent by weight of the monomer to a alkenyl aromatic polymer. At least a portion of the monomer polymerized is grafted as polymer molecules to the diene rubber as a superstrate.

The remainder of the polymer formed is dissolved in said monomer composition as polymerized forming a monomer-polymer solution. The monomer-polymer solution or phase is incompatible with the monomer-rubber solution or phase and phase separation is observed by the well known Dobry effect. As the polymer concentration of the monomer-polymer phase increases and has a volume slightly larger than the monomer-rubber phase, the monomer-rubber phase disperses as rubber-monomer particles aided by the shearing agitation of the stirred first reaction zone.

The agitation must be significant and of high enough shear to disperse and size the rubber particles uniformly throughout the monomer-polymer phase. The intensity of the stirring will vary with the size and geometry of the initial reactor, however, simple experimentation with a given stirred reactor will establish the sufficient amount of stirring needed to insure the homogeneous dispersion of the rubber particles throughout the monomer-polymer phase. The particle size of the rubber can be varied from a weight average particle diameter of from about 0.5 to 10 microns preferably from 0.5 to 5 microns to provide a balance between the impact strength and the gloss of the rubber reinforced polyblend. Higher stirring rates and shearing agitation can lower the size of the dispersed rubber particle, hence, must be controlled to provide sufficient stirring to size the particles to the predetermined size needed and insure homogeneous dispersion.

At steady state polymerization, in the initial polymerization zone, the continuously charged monomer composition containing 2 to 15 percent by weight diene rubber disperses almost instantaneously, under stirring, forming the rubber-monomer particles which on complete polymerization form discrete rubber particles. The conversion of monomers to polymers in the first reaction zone is controlled between 10-50 percent and must have a weight percent level that provides a polymer content in excess of the rubber content of the monomer composition to insure the dispersion of the monomer-rubber phase to a rubber-monomer particle phase having a predetermined size and being dispersed uniformly throughout the monomer-polymer phase.

The rubber particle becomes grafted with polymer in the first reaction zone which aids its dispersion and stabilizes the morphology of the particle. During the dispersion of the rubber-monomer particles, some monomer-polymer phase is occluded within the particle. The total amount of occluded monomer-polymer phase and grafted polymer present in the particles can be from about 1 to 6 grams for each gram said diene rubber.

The dispersed rubber phase increases the toughness of the polymeric polyblend as measured by its Izod impact strength by Test ASTM D-256-56. It has been found that the impact strength of polyblends increase with the weight percent rubber dispersed in the polyblend in the range of 2 to 15 percent as used in the present invention. The impact strength is also determined by the size of the dispersed rubber particles, with the larger particles providing higher impact strength within in the range of 0.5 to 10 microns measured with a photosedimentometer by the published procedure of Graves, M. J. et al., "Size Analysis of Subsieve Powders Using a Centrifugal Photosedimentometer," British Chemical Engineering 9:742-744 (1964). A Model 3000 Particle Size Analyzer from Martin Sweets Company, 3131 West Market Street, Louisville, KY was used.

The weight average diameter of the rubber particles also effects gloss with smaller particles giving high gloss and the larger particles giving low gloss to the fabricated polyblend article such as a molding or sheet product. One must balance impact strength and gloss requirements in selecting an optimum rubber particle size. The range of 0.5 to 10 microns can be used with the range of 0.5 to 5 microns being preferred and 0.8 to 3 microns being most preferred for optimum impact strength and gloss.

Processwise, in the initial reactor, one must (1) form and disperse the rubber particle, and (2) graft and stabilize the rubber particle maintaining its size and morphology or structure. The amount of occluded monomer-polymer phase described above is held at a predetermined level described above by steady state polymerization wherein the monomer is converted to polymer, at least a portion of which, grafts to the rubber stabilizing the rubber particle. It has been found that the higher the amount of occlusion stabilized within the rubber particle the more efficiently the rubber phase is used in toughening the polyblend. The rubber particle acts must as a pure rubber particle if the occlusions are controlled at the amount described above during their stabilization in the initial reaction zone and throughout the total polymerization process. The rubber particle is also grafted externally stabilizing its structure as to size and its dispersibility in the monomer-polymer phase.

The initial reactor forms a first mixture of a monomer-polymer phase having the rubber phase described dispersed therein. The first mixture is charged to a staged isobaric stirred reaction zone as a second zone. The first mixture is polymerized by progressive multistage substantial linear flow polymerizations with the conversion of polymer advancing from about 10-50 percent conversion in the first stage to 50 to 90 percent conversion in the final stage of the staged isobaric stirred reaction zone as a second zone. This provides a gradual progressive increase of polymer in the monomer-polymer phase. This has been found to be important in maintaining the morphology or structure of the dispersed rubber-monomer particles.

It has been found that in the initial reaction zone as the rubber particle is formed, that the rubber-monomer particle has a monomer content that corresponds to the monomer content of the monomer-polymer phase. The rubber-monomer particle will stabilize at this level as the monomer polymerizes inside the rubber particle and grafted polymer is formed on the rubber. Hence, it has been found that the lower the level of conversion or polymer in the monomer-polymer phase of the initial reactor the higher the amount of monomer found in the rubber-monomer particles formed as the rubber solution is charged and dispersed in the monomer-polymer phase. Conversely, if the conversion is high in the initial stage less monomer is occluded in the rubber phase particle on dispersion. As described earlier, the first mixture is polymerized in the staged linear flow second zone and the percent by weight of polymer being formed is progressively higher with each stage having a slightly higher polymer content. The staged linear progressive polymerization of the monomer giving desirable polymers but was found unexpectedly to preserve the integrity of the rubber particles. Although not completely understood, as the rubber particle becomes grafted and the monomer-polymer phase forms in the occluded monomer of the rubber particle, the monomer is not readily extracted from the rubber particle by the monomer-polymer phase as the polymer content increases gradually in the monomer-polymer phase during polymerizing in the staged reactor. It is thought that since the polymerization in the multistaged linear reaction zone is so gradual that polymer is being formed in both the rubber particle and the monomer-polymer phase at about the same rate, hence, the total polymer content of the occluded monomer-polymer phase of the rubber particle is about the same as polymer content of the monomer-polymer phase and monomer is not extracted, hence, the weight percent of occlusion is stabilized and remains substantially high after formation in the initial reactor.

It has been found possible to analyze the amount of total occluded polymer phase and grafted polymers. The final polymerized polyblend product (1 gram) are dispersed in a 50/50 acetone/methyl ethyl ketone solvent (10 ml.) which dissolves the polymer phase matrix leaving the rubber phase dispersed. The rubber phase is separated from the dispersion by centrifuge as a gel and dried in a vacuum oven at 50° C. for 12 hours and weighed as a dry gel.

$$\frac{\% \text{ Dry gel}}{\text{in Polyblend}} = \frac{\text{Weight of dry gel}}{\text{Weight of polyblend}} \times 100$$

$$\left.\begin{array}{l}\% \text{ Graft and} \\ \text{Occlusions} \\ \text{in Rubber}\end{array}\right\} = \frac{\% \text{ dry gel} - \% \text{ rubber}}{\text{Percent rubber*}} \times 100$$

$$\left.\begin{array}{l}\text{Parts** by weight} \\ \text{of graft polymer} \\ \text{and occluded polymer per unit weight} \\ \text{of rubber}\end{array}\right\} = \frac{\% \text{ dry gel} - \% \text{ rubber}}{\text{Percent rubber}}$$

*Percent rubber determined by infra-red spectrochemical analysis of the dry gel
** The present invention preferably has present about 0.5 to 5 grams of occluded and grafted polymer per gram of diene rubber particle.

The swelling index of the rubber graft particles is determined by taking the dry gel above and dispersing it in toluene for 12 hours. The gel is separated by centrifuge and the supernatant toluene drained free. The wet gel is weighed and then dried in a vacuum oven for 12 hours at 50° C. and weighed.

$$\text{Swelling Index} = \frac{\text{weight of wet gel}}{\text{weight of dry fel}}$$

As described earlier the amount of occlusions and graft polymer present in the rubber particle is present in the amount of about 0.5 to 6 parts for each part of diene rubber. The percent dry gel measured above then is the percent gel in the polymerized polyblend and represents the dispersed rubber phase having polymeric occlusions and polymeric graft. The percent gel varies with the percent rubber charged in the monomer composition and the total amount of graft and occluded polymer present in the rubber phase.

The swelling index of the rubber as determined above is important to the final properties of the polyblend. A low swelling index indicates that the rubber has been crosslinked by the monomer as it polymerizes to a polymer phase in the rubber-monomer particle. Generally, the conversion of monomer to polymer in the occlusion follows the rate of conversion of monomer to polymer in the monomer-polymer phase. In devolatilization, the temperatures of the second mixture is raised to about 200° to 250° C. for sufficient time to crosslink the rubber particles such that they have a swelling index of from about 7 to 20 preferably from about 8 to 16.

Preferably, the combined polymer of the matrix phase of the polyblends produced by this invention have a dispersion index ($M_w/M_n$), wherein $M_w$ is a weight average molecular weight and $M_n$ is a number average molecular weight, ranging from about 2.0 to 4.0 preferably 2.2 to 3.5. The dispersion index is well known to those skilled in the art and represents the molecular weight distribution with the lower values having narrow molecular weight distribution and higher values having broader molecular weight distribution. The average molecular weight of the combined polymer of the matrix phase preferable range from 200,000 to 400,000 as a weight average molecular weight.

EXAMPLE 1

A monomer composition consisting of 7.5 parts of a polybutadiene rubber in 92.5 parts of styrene monomer was prepared by agitating at 40° C. for 8 hours. The rubber used had a $M_w$ of 279,000, a $M_n$ of 170,000, a Mooney viscosity of 56, a 5 percent solution viscosity in styrene monomer of 162, an intrinsic viscosity of 2.64 and a $M_w/M_n$ of 1.62. The microstructure of the rubber contained about 35 cis-1,4 isomer, 53 percent trans-1,4 isomer and about 12 percent vinyl 1,2 isomer. To the above monomer composition is added 0.5 parts of white mineral oil, 0.1 part by weight of octadecyl 3-(3',5'-di-tertbutyl-4-hydroxyphenyl) propionate and 40 parts by weight of recycled styrene monomer. This monomer composition is fed continuously at approximately 145 lbs./hr. to a 100-gal. anchor-agitated initial reactor operated at approximately 50 percent fillage and 124° C. under 5 psig. nitrogen pressure. The agitator is approximately 31 inches wide and turns at 65 rpm. A first mixture containing approximately 18 percent polystyrene is pumped from the above reactor at a continuous rate such as to maintain essentially constant fillage therein and flows to the inlet of the second reactor, a staged isobaric stirred reactor. The second reactor has approximately a 50 gal. capacity and operates at about 40 percent fillage as described in U.S. Pat. No. 3,903,202.

The second mixture in the final stage is maintained at about 166° C. and contains about 62 percent polystyrene. Styrene vapor evaporated from the second reactor is condensed and the condensate is returned to the first compartment. The second mixture is pumped continuously from the final stage at a rate to maintain essentially constant fillage in the second reactor and is delivered to the inlet of the devolatilizer preheater. The second mixture exits from the preheater at approximately 240° C. and enters a devolatilizer chamber maintained at 50 torr. Second mixture volatile vapors exiting the devolatilizer chamber are condensed and recycled to the first reactor preheater feed system. Approximately 3 lbs./hr. of the condensed devolatilized vapors are withdrawn as purge. The devolatilized melt is fed from the devolatilizer chamber to an extruder which forms it into a plurality of strands which are then cooled and cut into pellets.

The polyblend formed was tested and found to have an impact strength of about 0.62 ft.lbs./inch of notch (3.42 kg.cm/cm).

EXAMPLE 2

Example 1 was repeated with a polybutadiene rubber having a $M_w$ of 284,000, a $M_n$ of 146,000, a Mooney viscosity of 52, a 5 percent solution viscosity in styrene of 177, an intrinsic viscosity of about 2.50 and a $M_w/M_n$ of about 1.95. The microstructure was essentially the same as the rubber of Example 1. The polyblend was tested for toughness and found to have an impact strength of about 1.06 ft.lbs/in. (5.8 kg.cm/cm).

EXAMPLE 3

Example 1 was repeated with a polybutadiene rubber having a $M_w$ of 306,000, a $M_n$ of 133,000, a Mooney visc. of 53, a 5 percent solution viscosity of 205, an intrinsic viscosity of 2.59 and a $M_w/M_n$ of about 2.3. The polyblend formed was tested for toughness and found to have an impact strength of about 2.24 ft.lbs./in. (12.2 kg.cm/Cm).

It is evident as rubber used in reinforced polystyrene polyblends has a broadened molecular weight that the impact strength increases unexpectedly by a considerable degree. The data shows that those rubbers having a $M_w/M_n$ or a dispersion index of greater than about 2.0 have a greatly increased toughness.

EXAMPLE 4

In a reaction vessel were stirred about 7.5 parts of a polybutadiene of Example 3 and about 92.5 parts of styrene monomer until the rubber dissolved. About 0.1 parts of t-butyl perbenzoate peroxide and 0.05 parts of t-dodecyl mercaptan, 0.5 parts of white mineral oil and 0.1 part of octadecyl 3-(3',5'-di-t-butyl 4-hydroxy phenyl propionate antioxidant.

Polymerization en masse was conducted to approximately 30.0 percent conversion and the syrup thus produced was thereafter admixed with 425.0 parts of water and a suspending agent formulation provided by 0.5 part of an interpolymer of 95.5 mol percent acrylic acid and 4.5 mol percent 2-ethylhexyl acrylate, 0.3 part calcium chloride and 1.0 part of the condensation product of naphthalene sulfonic acid and aldehyde sold by R. T. Vanderbilt under the trademark DARVAN. The suspension was stirred and initially heated to about 100° centigrade; thereafter, it was heated with stirring to about 155° centigrade for a polymerization cycle rate of about four hours and at a pressure of about 75 to 90 pounds per square inch. Thereafter, the batch was cooled, centrifuged, washed and dried to recover the polymerized product in the form of small spherical beads. The beads recovered from the polymerization process contained about 7.5 percent by weight rubber which had been grafted to a superstrate:substrate ratio of 170:100. The polyblend containing about 7.5 rubber was tested and found to have an impact strength of about 2.15. It is evident that the mass and mass/suspension process for polymerization gave a polyblend of superior impact strength if the rubber used has a dispersion index greater than about 2.

What is claimed is:

1. An improved polymeric polyblend composition characterized by a blend of:
   A. a polymer of at least one monoalkenyl aromatic monomer having dispersed therein an amount sufficient to toughen said polymer of
   B. a diene rubber, said rubber being dispersed as crosslinked rubber particles being grafted with said monomer as polymer and having occluded therein said polymer, said particles having a weight average diameter of from about 0.5 to 10 microns, wherein said improvement comprises:
   C. said diene rubber being a polybutadiene rubber having a broad molecular weight distribution characterized by having a dispersion index from about 2 to 6 a weight average molecular weight of from about 250,000 to 750,000 and a number average molecular weight of from about 125,000 to 200,000, and a microstructure having a cis-1,4 isomer content of from about 30 to 85 percent.

2. A polyblend of claim 1, wherein said diene rubber has a Mooney viscosity of from about 20 to 120.

3. A polyblend of claim 1, wherein said monoalkenyl aromatic monomer is selected from the group consisting of styrene, a-methyl styrene, chlorostyrene, dichlorostyrene, bromostyrene or dibromostyrene and mixtures thereof.

4. A polyblend of claim 1, wherein said diene rubber is selected from the group consisting of polybutadiene, poly-2-methyl butadiene, poly-2-chlorobutadiene and mixtures thereof.

5. A polyblend of claim 1, wherein said diene rubber is polybutadiene.

6. A polyblend of claim 1, wherein said polybutadiene rubber has a cis 1,4-isomer content of about 30 to 85 percent.

7. A polyblend of claim 1, wherein said monoalkenyl aromatic monomer is styrene.

8. A polyblend of claim 1, wherein said polymer has a molecular weight distribution characterized by a polymer dispersion index ranging from about 2.2 to 3.5 wherein said weight average molecular weight ranges from about 200,000 to 400,000.

9. A polyblend of claim 1, wherein said particles have present said graft and occluded polymer in amounts ranging from 0.5 to 6.0 parts per part of rubber moiety.

10. A polyblend of claim 1, wherein said polyblend has from about 1 to 15 percent by weight of said diene rubber moiety dispersed as crosslinked rubber particles.

11. A polyblend of claim 1, wherein said crosslinked rubber particles have a swelling index of from about 7 to 30.

* * * * *